United States Patent [19]

Schäfer et al.

[11] 4,331,736

[45] May 25, 1982

[54] PROCESS UTILIZING RELEASE AGENT

[75] Inventors: Wolfgang Schäfer, Aachen-Orsbach; Helmer Rädisch; Reinhold Fuchs, both of Aachen; Günther Esser, Herzogenrath, all of Fed. Rep. of Germany

[73] Assignee: Saint-Gobain Industries, Paris, France

[21] Appl. No.: 232,129

[22] Filed: Feb. 6, 1981

Related U.S. Application Data

[63] Continuation-in-part of Ser. No. 96,671, Nov. 23, 1979, abandoned, which is a continuation of Ser. No. 965,079, Nov. 30, 1978, abandoned, which is a continuation of Ser. No. 884,272, Mar. 7, 1978, abandoned.

[30] Foreign Application Priority Data

Mar. 8, 1977 [FR] France .............................. 77 06758

[51] Int. Cl.$^3$ ........................ B32B 27/40; B32B 17/06
[52] U.S. Cl. ........................... 428/425.6; 156/289; 264/2.3; 264/555; 264/556; 428/40; 428/341; 428/352; 428/411; 428/413; 428/432; 428/447; 428/522; 428/480; 428/469; 428/425.9; 427/162; 427/385.5; 427/388.4; 427/389.7; 427/393.5; 427/407.2; 427/409; 427/412.5
[58] Field of Search ................. 428/352, 40, 425.6, 428/425.9, 411, 432, 469, 480, 447, 413, 522; 526/2, 3, 5; 156/289; 260/18 N; 427/162, 385 A, 385 R, 407 A, 385.5, 388.4, 389.7, 393.5, 407.2, 409, 412.5; 264/2.3, 555, 556

[56] References Cited

U.S. PATENT DOCUMENTS

| | | | |
|---|---|---|---|
| 2,923,646 | 2/1960 | Jordan | 428/352 |
| 3,413,390 | 11/1968 | Heiss | 264/54 |
| 3,640,954 | 2/1972 | Kraft | 526/2 |
| 3,803,068 | 4/1974 | Mestetsky | 260/33.2 R |
| 3,855,052 | 12/1974 | Mestetsky | 428/352 |
| 3,882,071 | 5/1975 | Olstowski | 260/30.8 R |
| 3,882,072 | 5/1975 | Olstowski | 260/30.8 R |
| 3,979,548 | 9/1976 | Schäfer | 428/425.9 |

FOREIGN PATENT DOCUMENTS 1037114 2/1959 Fed. Rep. of Germany.
2306940 8/1974 Fed. Rep. of Germany .......... 526/3

OTHER PUBLICATIONS

"Release Agents", Encyclo. Poly. Sci. & Tech., vol. 12, pp. 57-65.

Primary Examiner—Ellis P. Robinson
Attorney, Agent, or Firm—John T. Synnestvedt; Alexis Barron

[57] ABSTRACT

In the manufacture of plastic articles, particularly thermoset plastic sheets having good optical properties, by a process which involves forming the article on a surface to which the article tends to adhere, numerous and important advantages are realized by using, as a release agent which facilitates removal of the article from the surface, a salt of an addition product of a lower alkylene oxide which can be prepared by the fixation of a lower alkylene oxide on an organic material having a group reactive therewith, such as, alcohols, acids and amides, and subjecting the resulting product to esterification and neutralization.

21 Claims, No Drawings

PROCESS UTILIZING RELEASE AGENT

CROSS-REFERENCE TO RELATED APPLICATIONS

This is a continuation-in-part of application Ser. No. 96,671, filed Nov. 23, 1979 now abandoned, which is a continuation of application Ser. No. 965,079, filed Nov. 30, 1978, now abandoned, which is a continuation of application Ser. No. 884,272, filed Mar. 7, 1978, now abandoned.

FIELD OF THE INVENTION

This invention relates to a process for the manufacture of plastic articles and to the use of a material which permits the article to be separated without damage from a surface on which it is formed and to which it tends to adhere. Materials which facilitate such separation are referred to commonly as "release agents".

Release agents are utilized in many types of applications for the purpose of facilitating the separation of two adhering surfaces. The present invention is described in connection with the use of a release agent in a particular type of application and one which involves the manufacture of a transparent thermoset plastic sheet having excellent optical properties. Although the present invention can be used to particular advantage in such an application, it should be appreciated that it can be embodied also in other types of applications in which release agents are used to advantage.

A significant and relatively recent development in the field of glazing laminates, particularly laminated safety glass such as laminated windshields, involves the use of a transparent thermoset plastic material, for example, a crosslinked polyurethane, which has excellent optical, self-healing and anti-lacerative properties. In one important application, a preformed sheet of the plastic material is adhered to the inner glass surface of a vehicle windshield for the purpose of reducing injuries to occupants of the vehicle. Upon impact by the head of an occupant, the plastic material resists tearing and protects the occupant from being cut by the shattered edges of the inner glass ply. Also, the occupant is protected from being cut by flying splinters of the glass in the event of impact from outside the vehicle against the exterior of the windshield. The self-healing properties of the plastic material are such that surface deformations such as local indentations tend to heal or disappear relatively quickly, for example within several minutes, or somewhat longer, depending on the nature of the indentation and the temperature of the plastic material. Accordingly, the optical properties of the plastic sheet are not adversely affected by the normal wear and tear to which windshields are subjected.

The manufacture on an industrial scale of high quality plastic sheets of the aforementioned type is no easy task, particularly as regards the consistent production of sheets having satisfactory optical properties, which must of necessity be of high calibre. In one type of continuous method for producing a solid flexible sheet of indefinite length, a liquid monomeric mixture of the reactants which form the thermoset plastic material is applied as a uniformly thick film to a moving glass support which consists of a series of highly polished smooth, flat plates of silicate glass. The liquid reactants polymerize on the moving glass support to form a solid synthetic plastic sheet which ultimately is removed from the glass support and cut to appropriate size. Since there is a tendency for the plastic sheet to adhere quite strongly to the underlying glass support, it is known to pre-coat the glass support with a release agent which facilitates removal of the sheet. The use of the release agent is intended to prevent the sheet from being damaged and/or to make the removal step more efficient. It has been found that the release agent is one of the many factors that plays a significant role in whether or nor sheets of high quality are produced on a consistent basis. As will be seen from the discussion which follows, various problems are encountered in utilizing release agents heretofor proposed for use in conjunction with self-healing/anti-lacerative plastic materials of the aforementioned type.

Reported Developments

The following materials have been disclosed as release agents for facilitating removal of a self-healing plastic sheet of the aforementioned type from a glass support: paraffin oil; low molecular weight polyolefins; silicone oils; curable silicone resins; and waxes based on polyolefins or esters (see British Pat. No. 1,370,480). The use of magnesium stearate as a release agent on a glass support is disclosed in U.S. Pat. No. 3,979,548, which is assigned to the same assignee as the present invention and which relates to self-healing polyurethanes having improved properties. In U.S. Pat. No. 3,990,876, also assigned to the same assignee as the present invention, there is disclosed a continuous process for forming a plastic sheet of the aforementioned type by depositing a liquid composition from which the plastic sheet is formed onto a continuous and moving smooth flat glass ribbon which issued from a float glass manufacturing line. The patent discloses the application to the glass ribbon of the following release agents for facilitating separation of the plastic sheet from the glass ribbon: stearates; silicones; fluorinated hydrocarbons; oils; and waxes.

Although the release agents disclosed in the aforementioned patents can be used effectively for certain types of applications, various problems of one sort or another are encountered when the goal is to consistently produce on an industrial scale in a continuous process sheets of indefinite length and having the high quality properties mentioned above. To meet this goal, the release agent should be capable of functioning in a variety of ways. The release agent should allow the sheet to be removed from its support with ease and without its being torn or otherwise damaged. It is important that the release agent not adversely affect, through chemical or physical mechanisms, any of the desired properties possessed by the sheet. The release agent should be capable of assuming a smooth planar surface on the support and not be a source of surface defects which adversely affect the optical or other properties of the sheet. Similarly, the release agent should not react with the monomeric constituents which polymerize to form the sheet, or with the product of reaction, in a manner that adversely affects any of the desired properties of the sheet. Also the release agent should be capable of being readily applied to and removed from the support. In this regard it is noted that the support is a highly polished and cleaned surface which is subjected to several aqueous treating stages. Inasmuch as deposits of release agent may be left on the support as the sheet is stripped therefrom, and since such deposits could adversely affect the optical qualitites of a sheet formed on the support as it is reused, it is advantageous to use a release agent which is water soluble and thus one which is readily removed by a water treatment. Another advantage of a water soluble release agent is that it can be applied to the support in the form of an aqueous solution, which, upon evaporation of the water, forms a coating of the release agent on the support. Compared to organic solvents, the use of water is much more convenient.

An object of this invention is to provide a release agent which is highly effective in permitting a plastic material to be removed readily from a surface to which it tends to adhere. Another object of this invention is to provide a release agent which is particularly effective in an application which involves a continuous process for manufacturing highly optical thermoset plastic sheets having self-healing and anti-lacerative properties and formed by depositing a uniformly thick liquid film of reactants on a moving flat smooth support such as a series of silicate glass plates.

SUMMARY OF THE INVENTION

In accordance with this invention, an improved release agent comprising a salt of an addition product of an organic substituted lower alkylene oxide is provided to facilitate separation of contacting surfaces which tend to adhere to each other. Preferred release agents for use in the practice of the present invention are of the formula $$R_1-X(C_2H_4O)_n-R_2$$

wherein: $R_1-X$ represents a fatty acid, fatty acid amide, or a fatty acid alcohol group, or when $R_1$ represents an alkyl group having about 8 to about 18 carbon atoms or an alkaryl group having about 6 to about 12 carbon atoms in the side chain, then X represents O—, CO—O or CO—NH; n represents an integer within the range of 1 to about 100; and $R_2$ represents $PO_3M_2$ or CO—CH(SO$_3$M)—CH$_2$COOM, or CO—C$_6$H$_4$—COOM, in which event, n is at least 25; and wherein M represents an alkali metal.

The release agents of the present invention have several highly attractive characteristics and their use results in quite a few important advantages. As will be seen from working examples reported below, the use of the release agents reduces substantially the amount of force required to separate plastic and glass surfaces, for example, by ten times. The release agents do not chemically adversely affect any of the desired properties of the plastic material or precursors thereof. In addition, the release agents are water soluble and are capable of being applied to a support in the form of an aqueous solution from which a coating, which does not adversely affect the properties of the plastic materials, is formed. Undesirable deposits of the release agent are readily removed by water washing.

Another important characteristic of the release agent of the present invention is its ability to improve properties of that surface of the plastic sheet with which it has been in contact. In this regard, improvements are realized in that the coefficient of friction of the plastic surface is reduced, thus improving the scratch resistance of the surface, and the creation of undesirable electrostatic charges is lessened or even eliminated. Such charges tend to attract to the surface of the sheet dust and other particles which can adversely affect the optical properties of the sheet.

DETAILED DESCRIPTION OF THE INVENTION

Release agents for use in the practice of the present invention are known materials which have been used as surfactants. For example, U.S. Pat. No. 3,803,068 discloses that improved release properties are achieved by combining with a release agent comprising a higher alkyl (C$_8$–C$_{22}$) vinyl ether-maleic anhydride copolymer a surfactant of the formula $$R-O(CH_2CH_2O)_n-X$$

wherein: R is alkyl, isoalkyl, alkylphenyl or isoalkylphenyl, alkyl in each case being C$_8$–C$_{20}$ alkyl; n is 0 to 5; and X is a sulfate or phosphate ester in either free acid or ammonium salt or alkali metal salt form. The patent discloses the use of the release agent/surfactant mixture on a variety of surfaces, including paper, plastic, (for example, polyurethanes), and inorganic materials such as ceramics and metals. The materials of the present invention have been found to be highly satisfactory release agents, particularly for use with surfaces comprising polyurethanes and silicate glass, when used by themselves, that is, independent of any other material which functions as a release agent.

Salts of an addition product of organic substituted lower alkylene oxides for use as a release agent in the present invention can be prepared by the fixation of a lower alkylene oxide on an organic material having a group reactive therewith and subjecting the resulting product to esterification and neutralization. Exemplary materials for reacting with the lower alkylene oxides are alcohols, acids and amides, which can include aliphatic or aromatic groups or mixed aliphatic/aromatic groups. Esterification can be effected with organic, inorganic or mixed polyfunctional acids, including for example, mineral acids, and aliphatic and aromatic acids. Neutralization can be effected by conventional means.

Preferred release agents of the present invention can be prepared by the reaction of ethylene oxide with a fatty acid-type material, for example, fatty acids, fatty acid amides, alkanol amides of fatty acids, and fatty acid alcohols. Esterification can be effected with acids that result in the groups represented by R$_2$ in the above formula. It is noted that the sulfosuccinate group may also be formed by utilizing a mixture of sulfurous and maleic acids. Neutralization is typically effected with an alkali metalcontaining base, typically one containing sodium or potassium.

The term "fatty acid" as used herein conforms with the definition found in *Webster's Third New International Dictionary* (unabridged) (1966) and includes any of the series of saturated aliphatic monocarboxylic acids C$_n$H$_{2n+1}$COOH (such as acetic or lauric acid) and any of the saturated or unsaturated monocarboxylic acids that occur naturally in the form of glycerides in fats and fatty oils, that in almost all cases contain an even number of carbon atoms, most commonly 12 to 24 in the higher acids, such as palmitic acid or oleic acid, and that in a few cases contain a substituting group, such as hydroxyl in ricinoleic acid.

The saturated fatty acids include butyric, caproic, caprylic, capric, lauric, myristic, palmitic, stearic, arachidic, behenic, lignoceric, and isovaleric acid, to name a few.

The unsaturated fatty acids include decenoic, lauroleic, myristoleic, palmitoleic, oleic (octadecenoic), gadoleic, erucic (dicosenoic), selacholeic, linoleic, hexadecatrienoic, linolenic, octadecatetraenoic, arachidonic, eicosapentaenoic, docosapentaneoic, docosahexaenoic, tetracosapentaenoic, tetracosahexaenoic, hexacosapentanoic, hexacosahexaenoic, ricinoleic and licanic acid, to name a few.

The term "fatty acid alcohol" as used herein means the alcohols of the higher fatty acids, such as lauryl alcohol, myristyl alcohol, palmityl alcohol etc. See, Bailey, *Industrial Oil and Fat Products*, 2nd Ed., pp. 762–65, Interscience Publishers, New York, 1951; and *The Condensed Chemical Dictionary*, 6th Ed. Reinhold Publishing Corporation, New York, 1961.

The term "fatty acid amide" as used herein means the amide derivative of a fatty acid. See, Bailey, *Industrial Oil and Fat Products*, op. cit., p. 484. See, also, the derivation of fatty nitriles as defined in *The Condensed Chemical Dictionary*, op. cit on p. 484.

As mentioned above, it is believed that the release agent of the present invention will find wide use in the manufacture of transparent thermoset or cross-linked plastic materials of the type having good optical, self-healing and anti-lacerative properties. A highly recommended material is the thermoset polyurethane described in U.S. Pat. No. 3,979,548. Sheets made from such polyurethanes have an excellent combination of properties and are prepared by curing a liquid mixture containing (1) a polyglycol ether resulting from the condensation of propylene oxide with trimethylolpropane and containing about 10.5 to about 12% by weight free hydroxyls together with (2) a biuret of 1,6-hexamethylene diisocyanate having about 21–22% by weight isocyanate groups, the weight of said biuret being between about 0.9 and 1.1 times the weight of said polyglycol ether.

The above-type polyurethanes are an improved species of the plastic materials described in U.S. Pat. No. 4,232,080, assigned to the same assignee as the present invention, which teaches that plastic materials having good self-healing and anti-lacerative properties should have the following properties: a modulus of elasticity below about 2,000 daN/cm$^2$ and an elongation to rupture in excess of about 60% with less than 2% plastic deformation, and preferably a modulus of elasticity of below about 1200 daN/cm$^2$, and an elongation to rupture in excess of about 70% with less than about 1% plastic deformation. Reference is also made to British Pat. No. 1,370,480 which discloses self-healing synthetic plastic materials, including polyurethanes and polyesters, for use in optical applications. The release agent of the present invention can be used with such materials also.

In a process utilizing the release agent of the present invention, the aforementioned type resinous articles can be made utilizing polymerization or curing methods which are conventional. Typically, heat and catalyst are used. Preferred catalyst for polyurethanes include tin compounds, and in particular, organotin compounds, specifically, dibutyltin dilaurate. Curing may be effected at temperatures of about 50° C. to about 100° C., and more preferably at temperatures of about 60° C. to about 80° C. It should be understood that these conditions are exemplary.

In preferred form, a sheet of indefinite length of the plastic material is made in a continuous process utilizing a moving glass support comprising a series of smooth flat plates of silicate glass on which the sheet is formed. Speaking generally, such a process includes cleaning and polishing the glass plates and applying thereto an aqueous solution of the release agent of the present invention in manner such that a uniform coating of the release agent is formed as the water evaporates. Exemplary application conditions include the use of an aqueous solution containing about 0.1 to about 1% by weight of the release agent applied to the glass plates in an amount such that there is deposited thereon about 0.1 to about 2.5 g/m$^2$ of release agent. Any suitable means can be used to apply the release agent, including, for example, spraying the release agent solution. The liquid reactants from which the plastic sheet is formed are applied to the coated support and allowed to polymerize. Sheets for use in windshields will typically have a thickness of about 0.2 to about 0.8 mm, preferably about 0.4 to about 0.6 mm and are flexible. After stripping the sheet from the support, the glass plates are prepared for re-use. This includes a water wash to remove any residue of release agent from the plates and then re-coating them with release agent.

Although it is preferred to form sheets for use in optical applications on a smooth flat glass surface in either a continuous or batch process, other support materials, for example, polished metal and plastic surfaces can also be used. Such materials can be in the form of individual plates or sheets for use in a batch type process or in the form of a series of individual plates or sheets for use in a continuous process of the type described above. The support can also be of continuous indefinite length like the glass ribbon described in aforementioned U.S. Pat. No. 3,990,876. The release agent of the present invention can be used to coat each of the aforementioned types of supports with good results.

The term "sheet" as used herein includes within its meaning materials of indefinite length and also pieces of the material, for example, pieces of the general size and shape of the article incorporating the material. Sheets prepared by a process utilizing the release agent of the present invention can be flexible or rigid and of varying thicknesses, including thicknesses smaller or greater than the thickness referred to above in connection with optical sheets for use in safety windshields.

The release agent of the present invention can be used in other types of applications, including non-optical applications, and with materials other than the ones mentioned hereinabove. For example, it can be used with inorganic and organic materials other than the specific ones referred to previously, including naturally occurring and synthetic organic and inorganic materials.

The release agent can be used on the surfaces of open or closed molds used to form thermoset or thermoplastic resinous articles or articles comprising other materials. It can be used in applications in which articles are formed by the congealing of molten resinous compositions or liquid compositions in which the plastic material is dissolved in a solvent.

Although conveniently used in the form of an aqueous solution, the release agent can be used in the form of an organic solution also. The concentration of the release agent in the solution and the amount applied to a surface can be adjusted as need be for any particular application.

EXAMPLES

The following examples are illustrative of the invention.

Example 1

A sheet of flat glass having an optically defect-free surface is heated to a temperature of about 80° C. and then coated with a release agent by spraying thereon 10 cm$^3$/m$^2$ of an aqueous solution of 0.5% disodium dodecyl-polyethylether-sulfosuccinate having an average of 3 to 4 ethoxy groups per molecule and represented by the formula:

$$C_{12}H_{25}-O-(C_2H_4O)_{3 \text{ to } 4}-CO-CH(SO_3Na)-CH_2-COONa.$$

After allowing the coating to dry for about 30 seconds, a liquid reaction mixture which polymerizes to form a thermoset, self-healing transparent polyurethane film, is applied to the coated sheet of glass. The liquid reaction mixture comprises the following constituents:

(A) 1000 g of a polyether prepared by condensing propylene oxide with trimethylolpropane and having a molecular weight of about 450 and containing 10.5%–12.0% of free hydroxyl groups;

(B) 1000 g of a biuret of 1,6-hexamethylenediisocyanate containing 21%–22% free NCO groups; and (C) 0.5 g of dibutyltin dilaurate.

The liquid film of polyurethane precursors, supported on the coated glass sheet, is heated to a temperature of about 80° C. After about six minutes, the liquid film polymerized into a solid thermoset self-healing transparent polyurethane film having anti-lacerative properties.

After cooling to ambient temperature, the film can be separated easily from the glass sheet as a result of the presence of the release agent. The force necessary to effect this separation is about 0.3 to 0.6 kg/cm of width of the film, measured by effecting the traction at a right angle. By way of comparison, it is noted that the force required to separate a like film from a sheet of glass not coated with a release agent is about ten times greater, that is, about 2 to 5 kg/cm of width of the film, and the use of such forces tend to damage the plastic film.

The examples which follow illustrate the use of other release agents of the present invention. Unless stated otherwise, the same procedure as described in Example 1 is used in the embodiments of each of the examples.

EXAMPLE 2

The release agent used in a process of the type described in Example 1 is disodium nonylphenyl polyethylether-sulfosuccinate containing about 50 ethoxy groups per molecule and represented by the formula $$C_9H_{19}-C_6H_4-O-(C_2H_4O)_{50}-CO-CH(SO_3Na)-CH_2-COONa.$$

EXAMPLE 3

Following the procedure described in Example 1, the release agent used is disodium decyl-polyethyl-ether phosphate containing about 20 ethoxy groups per molecule and represented by the formula $$C_{10}H_{21}-O(C_2H_4O)_{20}-PO_3Na_2.$$

EXAMPLE 4

Following the procedure described in Example 1, the release agent used is sodium octadecyl-polyethyletherphthalate containing about 25 ethoxy groups per molecule and represented by the formula $$C_{18}H_{37}-O(C_2H_4O)_{25}-CO-C_6H_4-COONa.$$

As in Example 1, the force of separation used to separate the solid flexible film from the underlying glass substrate is on the order of 0.3 to 0.6 kg/cm of width of the film. Examination of the film after separation from the glass substrate shows that it has an optically defect-free surface.

EXAMPLE 5

The procedure and release agent described in Example 1 are used, except that the solid plastic film is formed from a polyester resin (UP 630 of FARBWERKE HOECHST) which includes 2% by weight of dibutylperoxide (BUTANOX of the AKZO company) and 2% by weight of an accelerator having a base of vanadium (VN2 of the OXYDO Company). After polymerization of the resin, the formed solid plastic film is separated easily from the glass support.

EXAMPLE 6

Following the basic procedure described in Example 1 and using the release agent referred to in Example 1, a film of a silicone resin (Silicone 1200 of the GENERAL ELECTRIC COMPANY) is formed on the glass substrate. After hardening, the solidified silicone film is separated easily from the glass support.

EXAMPLE 7

The basic procedure described in Example 1 and the release agent referred to in Example 3 are used, but the coated support on which the liquid film is deposited comprises a flat plate of poly(methyl methacrylate) (Plexiglass of Rohm & Haas Co.) having parallel sides. A solid epoxy sheet is formed on the poly(methyl methacrylate) plate by applying thereto a polymerizable mixture comprising 100 parts of an epoxy (Lekutherm×50 of the Bayer Co.) and 18 parts of a hardener (T 3 of the Bayer Co.). The solid epoxy sheet formed from this mixture is separated readily from the support.

EXAMPLE 8

The procedure and release agent described in Example 1 are used, except that the support which is coated with the release agent is a sheet of specular polished nickel chrome steel 18-8. The solid polyurethane film formed on the coated support is separated readily therefrom.

EXAMPLE 9

The procedure described in Example 1 and release agent described in Example 3 are used, except that the support which is coated with the release agent is a sheet of specular polished nickel chrome steel 18-8. The solid polyurethane film formed on the coated support is separated readily therefrom.

The above examples illustrate several important characteristics of the present development. Noteworthy is that relatively small amounts of the release agent can be used effectively to permit separation of a thin, highly optical, polyurethane film from a support on which it is formed without damaging or otherwise adversely affecting desired properties of the film. The above examples illustrate also the ability of the release agent to function effectively with a variety of combinations of adhering surfaces, including glass/plastic surfaces, plastic/plastic surfaces, and metal/plastic surfaces. The examples also illustrate the effectiveness of the release agent with a variety of different types of plastic materials.

Table I presents the results that are obtained with release agents according to the present invention when used in accordance with the procedure described in Example I above. Comparative examples are also presented which use release agents outside the scope of the present invention.

The results in Table I are reported in terms of positive and negative signs. A negative sign indicates that the force required to remove the film from the substrate is great enough to tend to cause damage to the film, while a positive sign indicates that a lesser force is required, thereby enabling the film to be removed undamaged. A single positive sign indicates a satisfactory overall performance, while a double and triple sign reflects enhanced and superior overall performance. Indicators of overall performance comprise properties such as wetting, adverse effects of the film, and relative release force.

of an addition product of an organic substituted lower alkylene oxide with an organic acid, alcohol or amide.

2. In a process for forming a plastic article wherein a liquid composition from which said article is formed is applied to a glass, metal or plastic surface and congealed into solid form while on said surface, and wherein a release agent is applied to said surface to reduce the tendency of said article to adhere to said surface, the improvement comprising applying to said surface a release agent of the formula $$R_1-X(C_2H_4O)_n-R_2$$

wherein: $R_1$ represents an alkyl group having about 8 to about 18 carbon atoms or an alkaryl group having about 6 to about 12 carbon atoms in the side chain; X represents O—, CO—O—, or CO-NH, n represents an integer within the range of 1 to about 100; and $R_2$ represents $CO-CH(SO_3M)-CH_2COOM$, or $CO-C_6H_4-COOM$ in which event n is at least 25; and wherein M represents an alkali metal.

3. A process according to claim 2 wherein said surface is glass and said article comprises a polyester resin.

4. A process according to claim 2 wherein said surface is glass and said article comprises a silicone resin.

5. A process according to claim 2 wherein said surface is poly(methyl methacrylate) and said article com-

TABLE I

Release Agent Performance in Process of Forming Self-Healing Polyurethane Film
$R_1-X(CH_2CH_2O)_nR_2$

| Ex. No. | $R_1$ | X | n | $R_2$ | Results | |
|---|---|---|---|---|---|---|
| 10 | $C_{18}$ alkyl | O | 50–80 | sulfosuccinate | ⊕ ⊕ ⊕ | |
| 11 | $C_{12}=C_{15}$ alkyl | O | 3 | sulfosuccinate | ⊕ ⊕ | |
| 12 | lauryl | CONH | 2 | sulfosuccinate | ⊕ | |
| 13 | $C_8-C_{10}$ alkyl | O | 5 | $PO_3M_2$ | ⊕ ⊕ | |
| 14 | iso $C_9$ alkyl | O | 5 | $PO_3M_2$ | ⊕ ⊕ | |
| 15 | $C_9$ alkylaryl | O | 50 | $CO-C_6H_4COOM$ | ⊕ ⊕ | |
| C-1 | $C_{10}$ alkyl | O | φ | sulfosuccinate | ⊕ | poor wetting character |
| C-2 | $C_{12}-C_{16}$ alkyl | O | φ |سulfosuccinate | ⊕ | poor wetting character |
| C-3 | ricinoleyl | COO, O | φ | sulfosuccinate | ⊕ | poor wetting character |
| C-4 | $C_{12}$ alkyl | O | 3 | $CO-C_6H_4COOM$ | ⊖ | |
| C-5 | $C_{12}$ alkyl | O | 10 | $CO-C_6H_4COOM$ | ⊖ | |
| C-6 | $C_{12}-C_{14}$ alkyl | O | 3 | $SO_3M$ | ⊖ | |
| C-7 | $C_{10}-C_{14}$ alkyl | O | φ | $SO_3M$ | ⊖ | |
| C-8 | $C_{12}$ alkylaryl | O | φ | $SO_3M$ | ⊖ | |
| C-9 | $C_9$ alkyl | O | 7 | H | ⊖ | |
| C-10 | $C_9$ alkyl | O | 10 | H | ⊖ | |
| C-11 | glyceryl | O | 10 | H | ⊖ | |
| C-12 | $C_{12}$ alkyl | NH | 2 | sulfosuccinate | ⊖ | |
| C-13 | $C_{18}$ alkyl | NH | 5 | H | ⊖ | |
| C-14 | $C_{18}$ alkyl | NH | 10 | H | ⊖ | |
| C-15 | $C_{18}$ alkyl | NH | 15 | H | ⊖ | |
| C-16 | oleyl alkyl | COO | 12 | H | ⊖ | |
| C-17 | $C_{18} + C_{12}$ alkyl | COO | 35 | H | ⊖ | |
| C-18 | $C_{18}$ alkyl | COO | 35 | H | ⊖ | |
| C-19 | $C_{18}$ alkyl | COO | 50 | H | ⊖ | |

In summary, it can be stated that the present invention comprises means which are a valuable aid in the effective manufacture of an optical, plastic article that, by its nature, must have highly refined properties. In addition, the present invention can be used to good advantage in the manufacture of other types of articles.

What is claimed is:

1. In a process wherein separation of two adhering surfaces is facilitated by application of a release agent to at least one of the surfaces, the improvement comprising applying to at least one of said surfaces an aqueous solution of a release agent which is a sulfosuccinate salt prises an epoxy resin.

6. A process according to claim 2 wherein said surface is steel and said article comprises a polyurethane resin.

7. In a process for the manufacture of a transparent highly optical, solid plastic material wherein a liquid composition is applied to a flat smooth support having thereon a release agent, and wherein said liquid composition congeals on said support to form said solid plastic material, the improvement comprising utilizing as the sole release agent a compound of the formula $$R_1-X(C_2H_4O)_n-R_2$$

wherein: $R_1$—X represents a fatty acid, fatty acid amide or fatty acid alcohol group; or $R_1$ represents an alkaryl group having about 6 to about 12 carbon atoms in the side chain and X represents O-, CO-O, or CO-NH;

n represents an integer within the range of 1 to about 100; and $R_2$ represents $PO_3M_2$, CO-CH($SO_3M$)—$CH_2$COOM, or CO-$C_6H_4$-COOM; provided that when $R_2$ is CO—$C_6H_4$—COOM, then n is at least 25; and wherein M represents an alkali metal.

8. A continuous process for the manufacture of a transparent, self-healing, anti-lacerative, thermoset polyurethane sheet of indefinite length comprising:

(A) depositing a release agent on a moving support comprising a series of clean, smooth, flat glass plates by applying thereto an aqueous solution of the release agent;

(B) thereafter applying to said moving support a liquid mixture of reactants which are polymerized on said support to form said polyurethane sheet;

(C) removing said sheet from said support;

(D) cleaning said support with an aqueous wash, including removing residue release agent, if any, from said support; and (E) re-using said support to make additional polyurethane sheet by subjecting it to steps (A) to (D); wherein said release agent is a compound of the formula $$R_1-X(C_2H_4O)_n-R_2$$

wherein: $R_1$—X represents a fatty acid, fatty acid amide or fatty acid alcohol group; or $R_1$ represents an alkaryl group having about 6 to about 12 carbon atoms in the side chain and X represents O-, CO-O, or CO-NH;

n represents an integer within the range of 1 to about 100; and $R_2$ represents $PO_3M_2$, CO—CH($SO_3M$)—$CH_2$-COOM, or CO—$C_6H_4$—COOM; provided that when $R_2$ is CO—$C_6H_4$—COOM, then n is at least 25; and wherein M represents an alkali metal.

9. A process according to claim 8 wherein said polyurethane is formed from a mixture of reactants comprising: (1) a polyglycol ether resulting from the condensation of propylene oxide with trimethylolpropane and containing about 10.5 to about 12% by weight free hydroxyls and (2) a biuret of 1,6-hexamethylene diisocyanate having about 21-22% by weight isocyanate groups, wherein the weight of said biuret is between about 0.9 and 1.1 times the weight of said polyglycol ether.

10. A process according to any of the preceding claims wherein the release agent comprises disodium dodecylpolyethylene-ether-sulfosuccinate having an average of 3 to 4 ethoxy groups per molecule.

11. A process according to any of claims 1 to 9 wherein the release agent comprises disodium nonylphenyl polyethylene-ether sulfosuccinate containing about 50 ethoxy groups per molecule.

12. A process according to claims 2, 7, 8 or 9 wherein the release agent comprises disodium-decyl-polyethylene-ether phosphate containing about 20 ethoxy groups per molecule.

13. A process according to any one of claims 2 to 9, wherein the release agent comprises sodium octadecyl-polyethylene-ether-phthalate containing about 25 ethoxy groups per molecule.

14. A process according to any one of claims 1 to 9 wherein the amount of release agent present on the support or surface is about 0.1 to about 2.5 g/m².

15. A process according to any one of claims 2 to 9 wherein the release agent is applied to the support or surface in the form of an aqueous solution containing about 0.1 to about 1% by weight of release agent.

16. A process according to claim 2 or 7 including heating the liquid composition to congeal it.

17. An article comprising two surfaces adhered to each other, and sandwiched between said surfaces to facilitate separation thereof a release agent of the formula $$R_1-X(C_2H_4O)_n-R_2$$

wherein: $R_1$—X represents a fatty acid, fatty acid amide or fatty acid alcohol group; or $R_1$ represents an alkaryl group having about 6 to about 12 carbon atoms in the side chain and X represents O-, CO—O, or CO—NH;

n represents an integer within the range of 1 to about 100; and $R_2$ represents $PO_3M_2$, CO—CH($SO_3M$)—$CH_2$-COOM, or CO—$C_6H_4$—COOM; provided that when $R_2$ is CO—$C_6H_4$—COOM, then n is at least 25; and wherein M represents an alkali metal; one of the surfaces being glass.

18. An article according to claim 17 wherein the force of adhesion of said adhering surfaces is no greater than about 0.6 kg/cm of width of the surfaces.

19. An article according to claim 17 or 18 wherein one of said surfaces is silicate glass and the other surface is a thermoset polyurethane having optical, self-healing and anti-lacerative properties.

20. In a process wherein separation of two adhering surfaces is facilitated by application of a release agent to at least one of the surfaces, the improvement comprising applying to at least one of said surfaces an aqueous solution of a release agent which is a phthalate salt of an addition product of an organic substituted lower poly-(alkylene oxide) containing at least 25 alkylene oxide groups.

21. A process for the manufacture of a highly optical thermoset polyurethane sheet comprising:

(A) depositing a release agent on a smooth, flat support by applying thereto an aqueous solution of the release agent;

(B) thereafter applying to said support a liquid mixture of reactants which are polymerized on said support to form said polyurethane sheet; and (C) removing said sheet from said support; wherein said release agent is a compound of the formula $$R_1-X(C_2H_4O)_n-R_2$$

wherein: $R_1$ represents an alkyl group having about 8 to about 18 carbon atoms or an alkaryl group having about 6 to about 12 carbon atoms in the side chain; X represents O—, CO—O—, or CO—NH; n represents an integer within the range of 1 to about 100; and $R_2$ represents $PO_3M_2$, or, CO—CH($SO_3M$)—$CH_2$COOM, or CO—$C_6H_4$—COOM, in which event, n is at least 25; and wherein M represents an alkali metal.

* * * * *